United States Patent [19]

Pastor

[11] Patent Number: 4,949,381

[45] Date of Patent: * Aug. 14, 1990

[54] ELECTRONIC INDICIA IN BIT-MAPPED FORM

[75] Inventor: Jose Pastor, Westport, Conn.

[73] Assignee: Pitney Bowes Inc., Stamford, Conn.

[*] Notice: The portion of the term of this patent subsequent to May 30, 2006 has been disclaimed.

[21] Appl. No.: 245,479

[22] Filed: Sep. 19, 1988

[51] Int. Cl.$^5$ ............................................. H04L 9/00
[52] U.S. Cl. ...................................... 380/51; 380/30; 380/54
[58] Field of Search .............................. 380/30, 51, 54

[56] References Cited

U.S. PATENT DOCUMENTS

| | | | |
|---|---|---|---|
| 4,322,577 | 3/1982 | Brändström | 380/35 |
| 4,637,051 | 11/1987 | Clark | 380/51 |
| 4,649,266 | 3/1987 | Eckert | 380/51 |
| 4,658,094 | 4/1987 | Clark | 380/30 |
| 4,692,603 | 9/1987 | Brass et al. | 235/545 |
| 4,728,783 | 3/1988 | Brass et al. | 235/456 |
| 4,754,127 | 6/1988 | Brass et al. | 235/456 |
| 4,757,537 | 7/1988 | Edelmann et al. | 380/51 |
| 4,776,013 | 10/1988 | Kafri et al. | 380/54 |
| 4,782,221 | 11/1988 | Brass et al. | 235/494 |
| 4,802,218 | 1/1989 | Wright et al. | 380/51 |
| 4,831,555 | 5/1984 | Sansone et al. | 380/51 |
| 4,835,713 | 5/1989 | Pastor | 380/51 |

Primary Examiner—Salvatore Cangialosi
Attorney, Agent, or Firm—Robert H. Whisker; Melvin J. Scolnick; David E. Pitchenik

[57] ABSTRACT

An item bearing bit-mapped indicia with information encrypted by a public key which verifies a status of the item and a method and apparatus for applying such indicia. The indicia represents an encrypted message and has the form of an array of pixels, each pixel having a value selected from a predetermined set of values in accordance with a mapping of an encrypted message on to the array. Thus, a person having knowledge of the appropriate decryption key may scan the indicia to obtain the message and verify the status by decrypting the message. In one embodiment disclosed, the item is a mail piece and the status is the payment of postage. The indicia may have the form of a binary matrix transformed by matrix multiplication by a corresponding Hadamard matrix and the encrypted message may be encrypted using a public key encryption system.

19 Claims, 4 Drawing Sheets

```
01110000
01101011
00011100
00010110
11000011
00110111
01100101
10101000
```

```
    0       0 0         0           0           0       0           0 0         0
                            0           0           0           0
    0           00        00  000                   000 00        00             0
00 000                   0 0000 0                 0 0000 0                  000 00
00 000                      00      0                0   00                 000 00
 0 0000 0              000 00  0            0  00 000           0 0000 0
        0       00 0000 00000  00000000 00000 0000 00      0
 0   000 0              00 00000 000000 00000 00            0  000    0
 0       0                                                       0        0
                    0    00    0 00000000 0    00    0
 0      0 0000           00 000000 00         0000 0        0
00 000              0 0  0 00000000 0  0 0                 000 00
               00 0000 0000 0            0 0000 0000 00
 0   0000 0000               00      00            0000 0000    0
            0    00          00           00         00     0
 0 00000 0000    0       00 000000 00       0  0000 00000 0
 0 00000 0000    0       00 000000 00       0  0000 00000 0
            0    00          00           00         00     0
 0   0000 0000               00      00            0000 0000    0
               00 0000 0000 0            0 0000 0000 00
00 000              0 0  0 00000000 0  0 0                 000 00
 0      0 0000           00 000000 00         0000 0        0
                    0    00    0 00000000 0    00    0
 0       0                                                       0        0
 0   000 0              00 00000 000000 00000 00            0  000    0
        0       00 0000 00000  00000000 00000 0000 00      0
 0 0000 0              000 00  0            0  00 000           0 0000 0
00 000                      00      0                0   00                 000 00
00 000                   0 0000 0                 0 0000 0                  000 00
    0           00        00  000                   000 00        00             0
                            0           0           0           0
    0       0 0         0           0           0       0           0 0         0
```

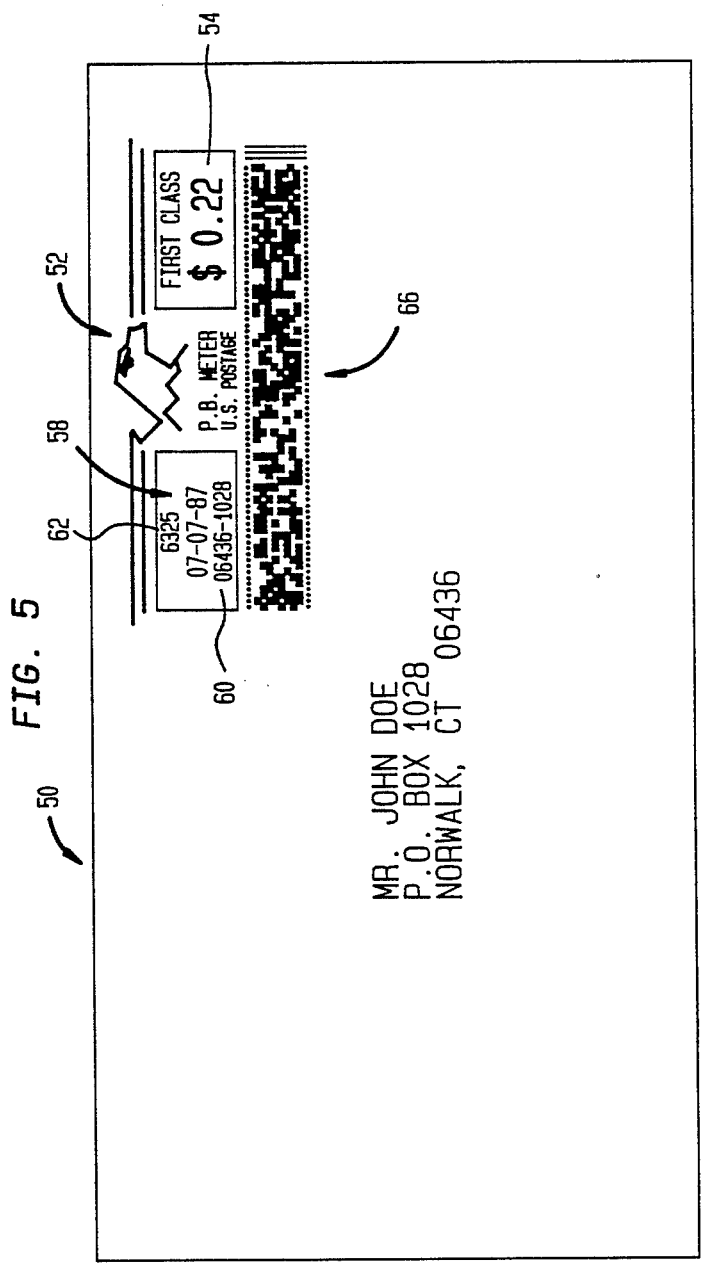

ELECTRONIC INDICIA IN BIT-MAPPED FORM

BACKGROUND OF THE INVENTION

This invention relates to electronic postage meters and metering systems, and particularly to an improved method and apparatus for ensuring the validity of a postal indicia printed by a postage metering system. The terms electronic postage meter and metering system, as used herein, also refer to other similar systems, such as parcel registers and tax stamp meters that dispense and account for value, and generally to systems for applying indicia to items to verify payment, or other status, for that item.

Since a postage meter may be looked upon as a machine for printing money (i.e. symbols having value) security has always been considered the heart of postage meter operation. In prior postage meters an indicia is printed by letter press, using a uniquely engraved die containing postal information; the information being such that the metered postage indicia is traceable to a particular postage meter. Newer postage meters have been developed that include electronically controlled printers such as thermal printers, ink jet, or dot matrix pin printers for printing the indicia. While these newer meters work well in concept they have significant security problems which must be addressed, since such indicia are easily printed by anyone having a suitably programmed computer and an appropriate printer. One way to ensure the validity of a particular indicia has been to encode a message in the indicia in such a manner that an unauthorized person who does not know the encryption scheme cannot reproduce the appropriate encoding. Such meters using encoded information in the indicia are disclosed, for example in co-pending application Ser. No. 724,372, to: Arno Muller, filed Apr. 7, 1985 and in a co-pending application by R. Sansone, entitled POSTAGE AND MAILING INFORMATION APPLYING SYSTEM, filed Aug. 6, 1985, both assigned to the Assignee of the present application.

In a system disclosed in application Ser. No. 515,073, to John Clark, filed July 18, 1983, and assigned to the Assignee of the present invention, there is taught another method and apparatus for producing coded indicia. This application teaches encoding such that the indicia is printed in human readable form with the pixels forming the indicia modified, by voids or displacements or the like, to produce a coded message which can then be decoded to verify that the coded information is identical to the human readable information of the indicia.

Still another form of coded indicia, using bar code, is taught in commonly assigned U.S. Pat. No. 4,660,221; to: Dlugos; issued Apr. 21, 1987.

Such systems generally are operative for their intended purpose, but suffer from limitations and disadvantages. First, in many cases the encryption scheme used to encode the information may be relatively simple and subject to attack by sophisticated computer analysis. Once a dishonest user is in possession of the encryption scheme used he would be in a position to generate undetectable counterfeit indicia. When it is considered that high volume mailers such as insurance companies, credit card companies, or oil companies may spend hundreds of thousands, if not millions, of dollars per year on postage, the incentive for such attacks can easily be seen. Another disadvantage of the above schemes is that it is highly desirable to use a distinct encryption key for each postage meter so that a breach of security for a single meter will not jeopardize the entire meter population. However, using conventional encryption, this approach would require that the Postal Service maintain a data base of keys for each of the hundreds of thousands of postal meters in service.

As is described in the commonly assigned U.S. patent application Ser. No. 140,051; to: Jose Pastor; for: SYSTEM FOR CONVEYING INFORMATION FOR THE RELIABLE AUTHENTICATION OF A PLURALITY OF DOCUMENTS; filed Dec. 31, 1987 these problems are solved by the use of "public key" encryption systems, such as the generally known RSA encryption system. These systems provide two keys, one of which may be used to encrypt, but not decrypt, a message, and a second key which is used to decrypt the message. By use of such a public key system in the manner described in the above referenced patent application, the disclosure of which is hereby incorporated by reference, distinct encryption systems may be provided for each meter, yet the Postal Service need only maintain a single public key to validate indicia. However, the use of the system taught in the above referenced patent application and the security of public key encryption schemes both require that large numbers be used, on the order of from 100 to 200 decimal digits, and be printed on a mail piece. Clearly, printing of such information in a conventional form as a string of decimal digits would be unacceptable.

Accordingly, it is an object of the present invention to provide an improved method for the validation of the status of an item, and particularly to validate the payment of postage on a mail piece.

More particularly, it is an object of the present invention to validate a status of an item by applying an indicia representative of large amounts of encrypted data in an acceptable manner.

BRIEF SUMMARY OF THE INVENTION

The above objects are achieved and the disadvantages of the prior art are overcome in accordance with the subject invention by means of an indicia applied to such item, and a method and apparatus for applying such indicia, which indicia represents an encrypted message and has the form of an array of pixels (i.e. picture elements) each having a value selected from a predetermined set of values in accordance with a mapping of an encrypted message on to the array. Thus, a person having knowledge of the mapping and the appropriate decryption key may scan the array to obtain the message and verify the status of the item by decrypting the message.

In a preferred embodiment of the subject invention, the values are either one or zero and the array corresponds to binary matrix.

In still another preferred embodiment of the subject invention, the message is encrypted using a public key encryption system such as RSA.

Thus, it may be seen that the above objects are achieved in accordance with the subject invention in a manner which is particularly advantageous for use with postage meters and similar systems using various forms of conventional, computer controlled printing, such as ink-jet printers or matrix printers. Other objects and advantages of the subject invention will become apparent to those skilled in the art from consideration of the attached drawings and the detailed description set forth below.

BRIEF DESCRIPTION OF THE DRAWINGS

FIG. 5 shows a mail piece marked with a postal indicia in accordance with the subject invention.

DETAILED DESCRIPTION OF PREFERRED EMBODIMENTS

Figure 1:
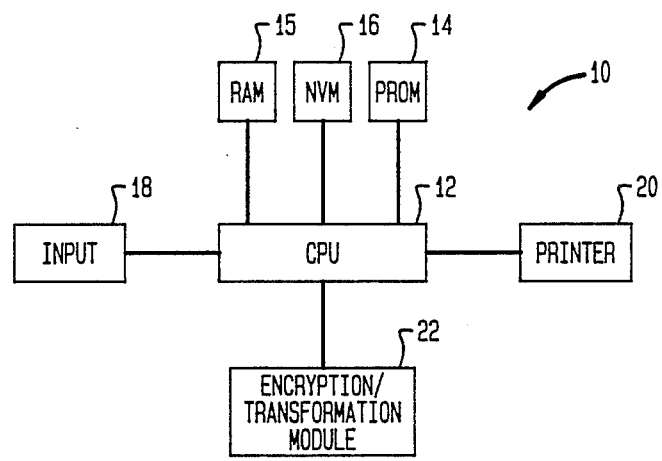
FIG. 1 shows a block diagram of a system for printing an indicia in accordance with the subject invention.

FIG. 1 shows a postage metering system 10 in accordance with the present invention. System 10 includes CPU, or microprocessor, 12, which operates under the control of a program residing in PROM 14 and controls the basic meter functions, performs calculations based on any input data, and controls the flow of data into the various memories. Typically, a random access memory (RAM) 15 is connected to CPU 12 for the storage of real time information and for real time accounting of critical information including the updating of ascending and descending meter registers, which record the postage value expended and available respectively. The register values are then stored in more permanent form in non-volatile memory 16 either when power is interrupted or on a real time basis, as is well known in the art.

The system operates in accordance with data (e.g. postage value to be metered) supplied from an input, such as keyboard 18, or from another remote communication device. Such operation of postage meters is well known and is described for example in U. S. Pat. No. 4,301,507, to Soderberg.

Metering system 10 differs from conventional postage meters using letter press printing in that CPU 12 is coupled to conventional, non-secure printer 20. Printer 20 receives print signals from CPU 12 for printing of postal information on an envelope, label or the like. Printer 20 may be a conventional dot-matrix pin printer or any one of a number of like devices, such as ink jet printers, thermal printers or LED printers, suitable for receiving electronic signals and applying corresponding pixels to an item. In accordance with the subject invention security against production of counterfeit indicia is not found in making the printer physically secure but in the form of the indicia (i.e. encryption).

As also seen in FIG. 1 CPU 12 is coupled to encryption/transformation module 22. Module 22 operates on data to generate an encrypted message in the manner described in the above referenced commonly assigned patent application Ser. No. 140,051. This message is preferably encrypted using a public key encryption system, most preferably RSA, and formatted as a binary matrix as will be described further below. In another embodiment of the subject invention, the initial binary matrix containing the message may be transformed by matrix multiplication as will be further described below.

Figure 2:
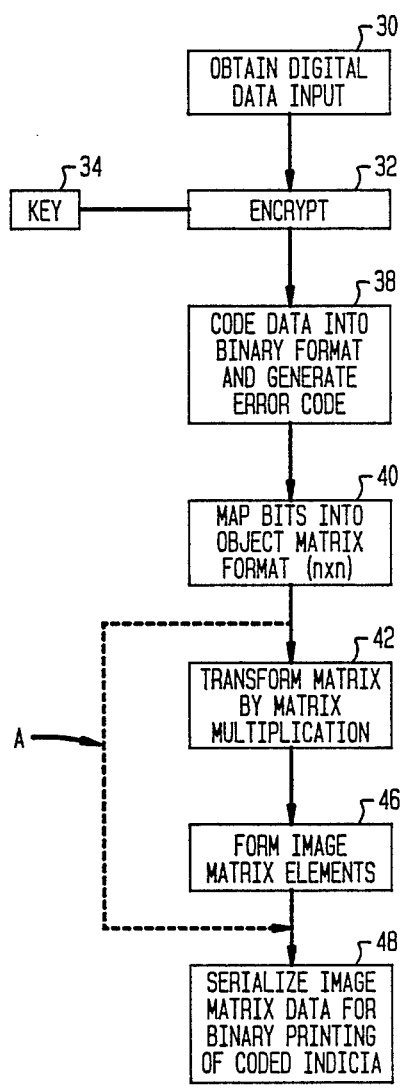
FIG. 2 shows a flow chart of the operation of the system of FIG. 1.

FIG. 2 shows a flow chart of the functions performed in module 22. It will be understood by those skilled in the art that, while module 22 is shown as a physically separate module including a microprocessor, which communicates in a conventional manner with CPU 12, that, depending upon the computational power of CPU 12, the functions shown in FIG. 2 may be performed by means of a program stored in PROM 14 and executed in a conventional manner by CPU 12.

Digital data is input at 30 and encrypted at 32 in accordance with public key 34 as is described in the above referenced commonly assigned patent application Ser. No. 140,051. At 38 the encrypted data is put into binary format and, preferably, an error code is generated and added. (The error code is conventional and may be a simple parity bit or may be a more extensive error detecting or correcting code.) At 38 the resulting binary code is mapped onto an m×n matrix in a predetermined manner, resulting in a binary matrix substantially similar, though generally larger than that, shown in FIG. 3.

To represent 100 decimal digits, approximately 333 binary bits are required. This information may be mapped in any predetermined manner, by rows, columns, etc. into a 19×19 matrix. To represent 300 decimal digits, approximately 1,000 binary bits are required, which may be mapped into a 32×32 binary matrix. Thus, assuming a scanning resolution of 32 pixels per inch, which is a pixel size of approximately 0.8×0.8 millimeters, 1,000 decimal digits may be represented as a bit mapped array of pixels one inch square.

Figures 3A, 3B, 4:
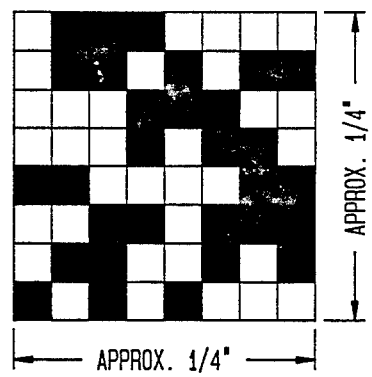
FIGS. 3A and 3B show a binary matrix of data representative of encrypted data and a corresponding array of pixels, respectively.
FIG. 4 shows a binary matrix of data resulting from the transformation of the matrix of FIG. 3A.

In one embodiment of the subject invention, illustrated by path A in FIG. 2, the binary matrix resulting at 40 is directly serialized and output for printing at 48, resulting in an array of pixels substantially similar, though generally larger than, that shown in FIG. 3B.

In another embodiment of the subject invention, the image formed at 40 may be transformed as described in commonly assigned U.S. Pat. No. 4,835,713; issued May 30, 1989 by matrix multiplication. In accordance with this embodiment of the subject invention, a matrix transformation is applied to the initial matrix produced at 40 at 42. A suitable and convenient transformation is a matrix multiplication of the form:

$$(IM)=(A)(OB)(A)$$

where (A) is a Hadamard matrix of the same size as the initial matrix (OB), shown as 8×8 in FIG. 3, and (IM) is the resultant transformed matrix product.

Hadamard matrices are a well known form of matrix which have the following properties: the first element of (IM) is the weight of (OB), that is the total number of ones in (OB); the number of bits required to represent a single element of (IM) is determined by the weight of (OB), that is nine bits to represent a weight of 1,023 in a 32×32 matrix; and the elements of (IM) may be either positive or negative but are all of the same parity.

Preferably, to avoid printing negative numbers, the parity of the total number of bits in (OB) is odd. That is, for a 32×32 matrix we allow only up to 1,023 ones. Negative numbers may then be represented by the complement to the maximum allowed number of ones (i.e. 1,023), avoiding the need for an extra sign bit. As is also taught in application Ser. No. 762,990, the resulting matrix may then be printed with two-fold or four-fold symmetry by reflection about a vertical and/or horizontal axis. FIG. 4 shows the binary matrix resulting from a transformation as described above applied to the matrix of FIG. 3A.

It is recognized that application of the above described transformation to matrix (OB) will substantially increase the size of the resulting pixel array, perhaps to the point where the array would be unacceptably large for printing on an envelope. However, it is within the contemplation of the subject invention to, at least partly, compensate for this by the use of color or gray scales to increase the number of bits which may be represented by each pixel; and it should be recognized that the redundancies introduced by symmetrical printing and/or error codes may allow the use of smaller pixel sizes while still obtaining satisfactory results. It should also be recognized that larger image sizes may be acceptable on documents, such as manifest, which are intended to accompany shipments or bulk mailings.

FIG. 5 shows an item to be mailed 50 (i.e. an envelope) marked with an indicia 52 produced in accordance with the subject invention. Indicia 52 includes the following plain text information relating to the item: a postage amount 54, a date 58 on which the item was metered, an ID number 60 for the meter, and a second ID number 62 for the postal station which the item is to be delivered in accordance with U.S.P.S. regulation for metered mail. Indicia 52 also includes a binary array 66 comprising a mapping of a public key encryption of at least a portion of the plain text information together with additional information as described in the above referenced, commonly assigned patent application. Binary array 62 consists of approximately 600 binary pixels; (without reflection) and is equivalent to approximately 180 decimal digits; ample to provide security for a message encrypted with the preferred RSA encryption technique.

The above description and drawings have been provided by way of illustration only, and will enable those skilled in the art to recognize numerous other embodiments of the subject invention. Accordingly, limitations on the subject invention are to be found only in the claims set forth below.

What is claimed is:

1. An item bearing an indicia, said indicia verifying the status of said item, and wherein said indicia represents an encrypted message and has the form of an array of pixels having a values selected from a predetermined set of values in accordance with a mapping of said encrypted message onto said array, whereby a person may scan said array to obtain said message and verify said status by decrypting said message.

2. An item as described in claim 1 wherein said status is the payment of postage for said item.

3. An item as described in claim 1 wherein said set of values consists of two discreet values corresponding to 0 and 1.

4. An item as described in claim 3 wherein said mapping comprises an initial mapping to form an initial array and a transformation of said initial array by matrix multiplication.

5. An item as described in claim 4 wherein said multiplication has the form (A) (OB) (A), and wherein A is a Hadamard matrix and OB corresponding to said initial array.

6. An item as described in claim 5 wherein said encrypted message is encrypted using a public key encryption key scheme.

7. An item as described in claim 1 wherein said encrypted message is encrypted using a public key encryption scheme.

8. An apparatus for applying indicia, said indicia verifying the status of items upon which said indicia are applied, comprising:
   means for applying an array of pixels, said pixels having values selected from a predetermined set of values;
   means for selecting said values for said pixels in accordance with a mapping of an encrypted message onto said array.

9. An apparatus as described in claim 8 wherein said status is the payment of postage.

10. An apparatus as described in claim 9 wherein said array corresponds to a binary matrix and wherein said selecting means further comprises means for generating an initial mapping of said encrypted message onto an initial binary matrix and means for transforming said initial matrix by matrix multiplication to form said corresponding binary matrix.

11. An apparatus as described in claim 10 wherein said matrix multiplication has the form A (OB) A, and wherein (A) is a Hadamard matrix and (OB) is said initial matrix.

12. An apparatus as described in claim 11 further comprising means for generating said encrypted message in accordance with a public key encryption system.

13. An apparatus as described in claim 8 further comprising means for generating said encrypted message in accordance with a public key encryption system.

14. A method of verifying the status of an item comprising the steps of
   (a) encrypting a message, said message being representative of said status;
   (b) selecting values for an array of pixels from a predetermined set of values in accordance with a mapping of said encrypted message onto said array; and,
   (c) applying said array to said item.

15. A method as described in claim 14 wherein said status is the payment of postage.

16. A method as described in claim 15 wherein said array corresponds to a binary matrix and wherein said selecting step comprises the further steps of generating an initial mapping of said encrypted message onto an initial binary array and matrix multiplying said initial binary matrix to form said corresponding binary matrix.

17. A method as described in claim 16 wherein said matrix multiplication has the form (A) (OB) (A), and wherein (A) is a Hadamard matrix and (OB) is said initial binary matrix.

18. A method as described in claim 17 comprising the further step of generating said encrypted message in accordance with a public key encryption system.

19. A method as described in claim 14 comprising the further step of generating said encrypted message in accordance with a public key encryption system.

* * * * *